(12) United States Patent
Schneider et al.

(10) Patent No.: US 9,070,234 B2
(45) Date of Patent: Jun. 30, 2015

(54) METHOD AND DEVICE FOR IDENTIFYING VEHICLES

(75) Inventors: Klaus Schneider, Ludwigsburg (DE); Mirko Wagner, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 14/122,656

(22) PCT Filed: Apr. 11, 2012

(86) PCT No.: PCT/EP2012/056489
§ 371 (c)(1),
(2), (4) Date: Feb. 26, 2014

(87) PCT Pub. No.: WO2012/163586
PCT Pub. Date: Dec. 6, 2012

(65) Prior Publication Data
US 2014/0188328 A1    Jul. 3, 2014

(30) Foreign Application Priority Data
May 31, 2011   (DE) .................. 10 2011 076 768

(51) Int. Cl.
*G07C 5/00* (2006.01)
*G06Q 10/10* (2012.01)

(52) U.S. Cl.
CPC ............... *G07C 5/008* (2013.01); *G06Q 10/10* (2013.01)

(58) Field of Classification Search
CPC ................................ G06Q 10/10; G07C 5/008
USPC ........................................................ 701/29.6
See application file for complete search history.

(56) References Cited

U.S. PATENT DOCUMENTS

| 6,768,935 | B1 * | 7/2004 | Morgan et al. ............... 701/29.6 |
| 2002/0007237 | A1 | 1/2002 | Phung et al. | |

FOREIGN PATENT DOCUMENTS

| EP | 0 997 638 | 5/2000 |
| EP | 1 603 054 | 12/2005 |

OTHER PUBLICATIONS

International Search Report for PCT/EP2012/056489, dated Jul. 17, 2012.

* cited by examiner

*Primary Examiner* — Mary Cheung
*Assistant Examiner* — Yuen Wong
(74) *Attorney, Agent, or Firm* — Kenyon & Kenyon LLP

(57) ABSTRACT

A device for identifying a vehicle includes: an input interface receiving a first input of feature specificities of first features of a vehicle; a database device which stores a component model, an identification model, and an information unit model; a computation device ascertaining second features which make possible an unequivocal identification of the vehicle in relation to the intended diagnosis; and an output device outputting the second features ascertained by the computation device, the input interface receiving a second input of feature specificities of the second features of the vehicle through the user, and the computing device ascertaining, as a function of the second input, a relation associated with the intended diagnosis from the information unit model of the database device.

6 Claims, 1 Drawing Sheet

METHOD AND DEVICE FOR IDENTIFYING VEHICLES

BACKGROUND OF THE INVENTION

1. Field of the Invention

The present invention relates to a method, a device and a vehicle testing device for identifying vehicles, in particular prior to the performance of vehicle diagnoses using vehicle testing devices in vehicle repair shops or vehicle testing stations.

2. Description of the Related Art

Many functions of today's motor vehicles are performed by electronic control units connected to the electronic system of the vehicle. In order to diagnose errors in the vehicle electronics correctly, diagnostic testers or diagnostic devices are used, which are equipped with appropriate diagnostic procedures. Ensuring a functionally proper communication of the diagnostic systems with the vehicle's own systems is based on precise knowledge of the components of the vehicle to be diagnosed as well as their functions and properties. Particularly when there is a multitude of vehicle types, vehicle manufacturers, vehicle components and variants in the equipment of a vehicle, high demands are placed on methods for identifying vehicles. Moreover, depending on the diagnosis to be performed, different degrees of vehicle identification become necessary since there are substantial differences in the definition of the diagnosis prerequisites and diagnosis options depending on the type of diagnosis and the technical equipment of the vehicle to be diagnosed.

Today's diagnostic devices have input systems by which a user is able to identify a vehicle to be diagnosed in an unequivocal manner. For instance, characteristics of vehicles and their technical equipment may be retrieved from a database via identification codes or identification numbers. Entering such codes via an input interface of the diagnostic device makes it possible possible for the diagnostic device to identify the vehicle to be diagnosed via a database query for example. Codes normally used are for example the so-called KBA numbers, under which vehicles are registered according to type, manufacturer, motorization and similar characteristics in the Kraftfahrzeug-Bundesamt (KBA) [German Federal Motor Vehicle Registration Agency], or the vehicle identification number (VIN or FIN, "Fahrzeug-Identifikationsnummer"), which identify every motor vehicle biuniquely for example according to the ISO 3779 standard.

Published European patent application document EP 1 603 054 A1 discloses a system for determining characteristic technical features of a motor vehicle via a database, in which the technical characteristics of individual motor vehicles and groups of motor vehicles are stored encoded according to identification codes.

There exists a need for solutions for the appropriate and efficient identification of vehicles, which are adapted to the type, scope and function of the vehicle diagnoses to be performed.

BRIEF SUMMARY OF THE INVENTION

The present invention is based on the idea of classifying a vehicle as a function of the type and scope of the diagnoses to be performed. A dynamic vehicle identification scheme may be used for this purpose, which accesses various ontological vehicle, component and/or diagnostic models in order to offer a user, for example a maintenance technician, a quick, intuitive and error-resistant identification of a vehicle to be diagnosed. Such an identification therefore also takes into account the individually required features for performing a diagnosis correctly using a diagnostic device or a diagnostic tester from the point of view of a user of the diagnostic device.

According to one specific embodiment, the present invention therefore creates a device for identifying a vehicle, having an input interface, which is designed to receive a first input of feature specificities of first features of a vehicle and an intended diagnosis of the vehicle by a user; a database device, which stores a component model, in which definitions of vehicle components are stored as component instances, an identification model, in which associations of features and their feature specificities are stored, and an information unit model, in which items of diagnostic information and their relations to the associated feature specificities stored in the identification model as well as component instances stored in a component model are stored; a computation device, which is designed to ascertain, as a function of the first input, with the aid of the component instances, associations and relations stored in the database device, those second features, which make possible an unequivocal identification of the vehicle in relation to the intended diagnosis; and an output device, which is designed to output to the user the second features ascertained by the computation device; the input interface being further designed to receive a second input of feature specificities of the second features of the vehicle through the user, and the computing device being further designed to ascertain, as a function of the second input, a relation associated with the intended diagnosis from the information unit model of the database device.

According to another specific embodiment, the present invention creates a vehicle diagnostic unit having a device according to the present invention and a diagnostic device, which is designed to execute a test program for a vehicle, the testing device controlling the test program as a function of the relation associated with an intended diagnosis, which was ascertained by the computing device. By integrating a dynamic vehicle identification system in a vehicle diagnostic unit, it becomes possible to define, in the vehicle diagnostic unit, feature specificities of a vehicle to be tested as required, efficiently and simply such that the vehicle diagnosis may be performed with the aird of a test program in a functionally adequate manner on the basis of the defined feature specificities.

According to another specific embodiment, the present invention creates a method for identifying vehicles, having the steps of receiving a first input of feature specificities of first features of a vehicle and an intended diagnosis of the vehicle by a user via an input interface; ascertaining second features, which allow for an unequivocal identification of the vehicle in relation to the intended diagnosis, by a computing device as a function of the first input, the computing device ascertaining the second features with the aid of a database device, which stores a component model, in which definitions of vehicle components are stored as component instances, an identification model, in which associations of features and their feature specificities are stored, and an information unit model, in which items of diagnostic information and their relations to associated feature specificities stored in the identification model as well as component instances stored in a component model are stored; outputting the second features ascertained by the computing device via an output device to the user; receiving a second input of feature specificities of the second features of the vehicle via the input interface by the user; and ascertaining a relation associated with the intended diagnosis from the information unit model of the database device through the computing device as a function of the second input.

With the aid of the present invention, users, for example maintenance technicians, repair technicians or other employees of a vehicle repair shop, are able to identify vehicles simply and quickly in accordance with the intended diagnosis. The dynamic ascertainment of features, the definition of which by the user may result most quickly and effectively in an unequivocal discrimination between different relations on the basis of associations between intended diagnoses and identification features belonging to these diagnoses stored in a database device, makes it possible to avoid an over-identification or under-identification of a vehicle by a user. This makes it possible to perform an identification of a vehicle more quickly and with fewer potential sources of error when inputting features. The effort for the user is minimized by such a dynamic system since the information may be presented to the user in a clearer fashion and limited to what is essential.

In one advantageous specific embodiment, the device according to the present invention may have an identification model that includes features describing the vehicle, their feature specificities and code numbers. The identification model and/or the component model are able to implement ontological relationship models. This makes it possible to include different existing classification and identification schemes dynamically in the diagnosis.

The above embodiments and developments may be combined as desired if such a combination is useful. Additional possible embodiments, developments and implementations of the present invention also include combinations of features of the present invention not explicitly mentioned above or below with regard to the exemplary embodiments.

DETAILED DESCRIPTION OF THE INVENTION

Unless stated otherwise, identical or functionally equivalent elements, features and components have been provided with the same reference symbols. It is understood that components and elements in the figures are not necessarily depicted true to scale with respect to one another for reasons of clarity and comprehensibility.

Vehicle diagnostic units in the sense of this application are not limited to specific diagnostic units. They may include for example axle measurement testing devices, engine testers, emission testing devices, brake testing devices, shock absorber testing devices, toe testing devices, weighing devices, brake fluid testing devices, sound level meters, diesel smoke gas testers, wheel-alignment analyzers, toe-angle testing devices, steering angle testers, air-conditioning testing devices and the like. The vehicle diagnostic units may also include conventional electronic devices such as smartphones, laptops, PCs, PDAs or similar devices, which have special diagnostic software for vehicle diagnostics. These vehicle diagnostic units may be used in repair shops, in particular in motor vehicle repair shops, test sites or similar facilities. In particular, the methods and devices according to the present invention may be used in equal measure in these facilities.

Features in the sense of this application may include concepts and definitions that are suitable to characterize components of vehicles. In this context, components of vehicles may be individual components or parts of vehicles, for example fuel injectors, lambda probes, catalytic converters, batteries, ignition devices or similar components. The components of vehicles in turn may be made up of different parts, so-called sub-components. Component instances in the sense of the present invention describe specific characteristics of components in vehicles, for example regarding their installation position relative to other components or their multiplicity in a vehicle. For instance, a vehicle may include as component instances of the component lambda probe the instances "lambda probe upstream from the catalytic converter" and "lambda probe downstream from the catalytic converter". As another example, a vehicle may include the component "injector" in a fourfold implementation such that the corresponding component instances are "injector 1", "injector 2", "injector 3" and "injector 4". Furthermore, multiple components may be assigned to different component groups. It is clear to one skilled in the art that a multitude of possibilities exists for the definition of components, component instances and component groups.

Figure 1:
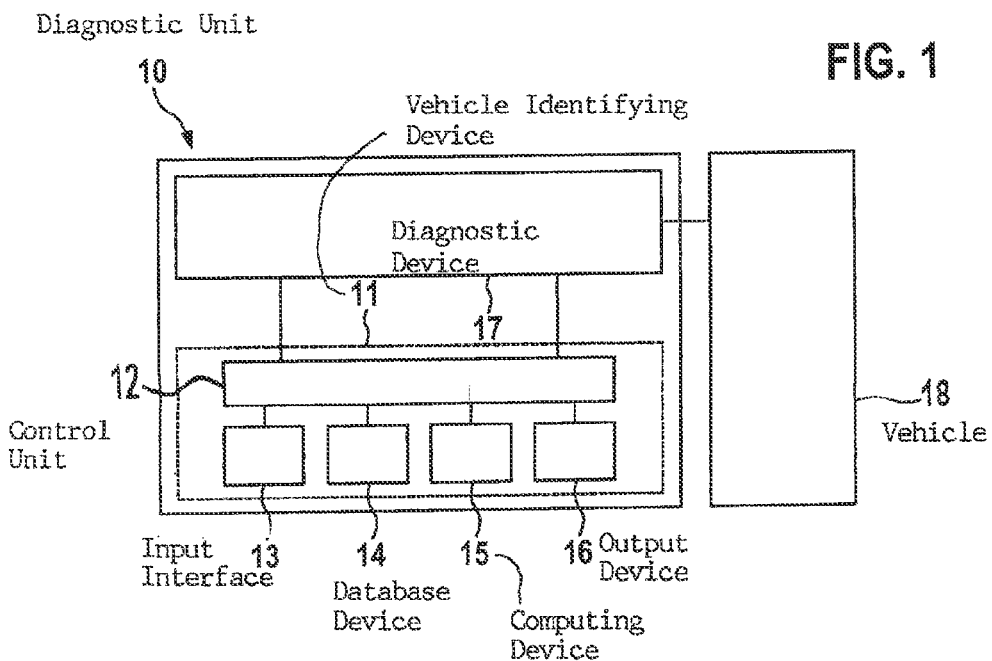
FIG. 1 shows a schematic representation of a device for a vehicle diagnostic unit for identifying a vehicle according to one specific embodiment of the present invention.

FIG. 1 shows a schematic representation of a vehicle diagnostic unit 10 for identifying a vehicle 18. Vehicle diagnostic unit 10 includes a device 11 for identifying a vehicle 18. It is furthermore possible for vehicle diagnostic unit 10 to include a diagnostic device 17, which may be connected to vehicle 18 or to control units of vehicle 18, and which is able to execute one or multiple testing or diagnostic programs, which are suitable for performing diagnoses and/or tests on vehicle 18. There may also be a provision for diagnostic device 17 to include software, which has specific vehicle diagnostic programs, by which control units in vehicle 18 may be activated, read out and/or adjusted.

Device 11 includes an input interface 13, a database device 14, a computing device 15 and an output device 16. There may be furthermore a provision for device 11 to have a control unit 12, via which the remaining appliances of device 11 may be connected together. Alternatively, there may also be a provision for computing device 15 to take over the tasks of control unit 12, and for the remaining components to be connected to computing device 15. For example, computing device 15 may include a microprocessor, an integrated circuit or a similar device.

Input interface 13 may be designed to detect inputs of a user.

For this purpose input interface 13 may include a keyboard, a computer mouse, a touch screen or similar device. Input interface 13 may be also be coupled for example to output device 16. For example, output device 16 may have a screen or other graphical display device, over which input interface 13 is superimposed as a transparent touch screen. A user may initiate inputs via input interface 13 as a function of graphical symbols or representations of information on output device 16.

Via input interface 13, a user is able to provide feature specificities of first features as input to device 11. Possible feature specificities of the feature "vehicle manufacturer" for example are the specificities "VW", "Ford" or "BMW". As another example, feature specificities of the feature "vehicle model" are the specificities "Golf", "Passat" or "525". Via input interface 13, a user furthermore is able to provide an intended diagnosis as input. For example, the user may input "testing the lambda probe" as a diagnosis.

Figure 2:
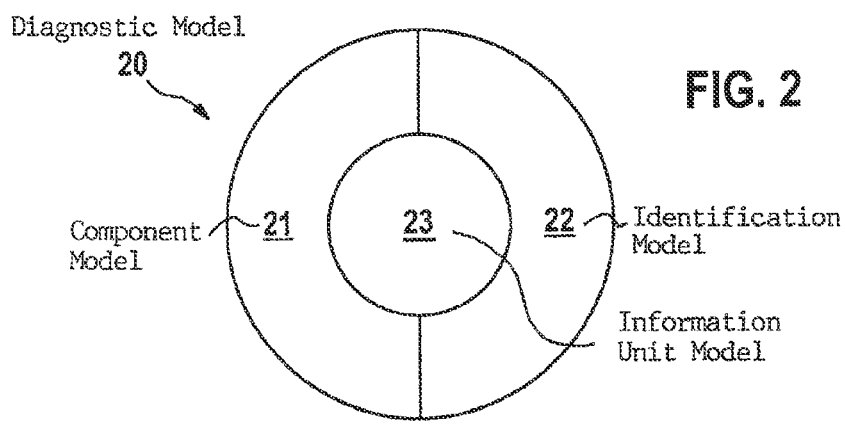
FIG. 2 shows a schematic representation of an ontological model for vehicle identification data for the vehicle diagnosis according to another specific embodiment of the present invention.

Database device 14 may include a diagnostic model 20, which is shown in FIG. 2 in exemplary fashion. Diagnostic model 20 may include for example a component model 21, an identification model 22 and an information unit model 23.

Component model 21 contains definitions of vehicle components as component instances. Identification model 22 contains assignments of identification features to feature specificities. For example, a semantic and/or ontological connection may be established in the identification model between the descriptive features. For example, various feature specificities of the feature "vehicle model" such as "Golf" and "Passat", for instance, may be assigned to the feature specificity "VW" of the feature "vehicle manufacturer". For this purpose, identification model 22 may be implemented with the aid of a relational database or within the scope of the web ontology language (OWL), which provides ontologies in a formal description language.

Every combination of feature specificities described in identification model 22 describes a subset of the set of all real vehicles. For this purpose, features may be divided into descriptive features and key features. Descriptive features are features that may be ascertained by observation or determination of feature specificities on the vehicle, for example the manufacturer, model name, engine displacement, drive type or similar features. Key features, on the other hand, are classificatory features that cannot be observed directly on the vehicle and are assigned to components or component groups of the vehicle via an assignment table, for example KBA numbers, order numbers of vehicle components or the like.

Information unit model 23 includes items of diagnostic information and their relations to associated feature specificities stored in identification model 22 as well as component instances stored in a component model. Relations, for example, may include a set of features that must be known for a specific type of diagnosis or a diagnostic procedure in order to be able to identify a vehicle unequivocally in relation to the diagnosis. Such items of information and relations may include for example circuit diagrams, installation positions, safety information, diagnostic functions, testing instructions or the like.

Each relation, for example, may be assigned one of the subset descriptions from identification model 22. For example, a relation may concern testing instructions, in which an "injector 1", an "injector 2" and a "lambda probe upstream from the catalytic converter" are defined as component instances. Such testing instruction may be valid for example for the feature specificities "VW", "Golf" and "four-wheel drive". Now it may be possible, for example, that in a first input a user selected the feature specificities "VW" for the feature "vehicle manufacturer" and "Golf" for the feature "vehicle model". At the same time, in the first input for example, the user selected the intended testing instructions of the injectors and the lambda probe. with the aid of diagnostic model 20 stored in database device 14, calculation device 15 is now able to determine that the feature specificity of the feature "type of drive" suffices to determine the testing instructions unequivocally. In this case, calculation device 15 may select as a second feature the feature "type of drive" and display it via output device 16 in order to prompt the user to provide the feature specificity of the feature "type of drive" as the second input via input interface 13. If the user now provides the feature specificity "four-wheel drive" as a second input via input interface 13, then calculation device 15 is able to ascertain a relation associated with the intended diagnosis from information unit model 23 of database device 14, in this case for example the test sequence.

Generally speaking, on the basis of the previous input of feature specificities and intended diagnoses of a user, calculation device 15 is able to ascertain subsets of features and associated assignments in identification model 22 as well as diagnostic information and their relations in information unit model 23. In particular, calculation device 15 is able to ignore features that are not relevant for the further distinction of applicable subsets. When entering the feature specificity "VW" as the vehicle manufacturer, for example, all features and items of information relating to components of the feature specificity "BMW" may be ignored. Such features and components are no longer displayed to the user by calculation device 15 on output device 16. This increases the transparency and clarity of the system as a whole.

Furthermore, on the basis of the feature specificities known so far with regard to to intended diagnosis, calculation device 15 is able to ascertain those features, the definition of which or the determination of the specificity of which promises the greatest gain in information, that is, the entry of which on the part of the user limits the set of results of all subsets ascertained so far to the greatest degree. These features may be communicated to the user via output device 16. This makes it possible to guide the user in an intuitive manner through the intended diagnosis in that only those features are queried which are relevant for the unequivocal identification of the intended diagnosis. This advantageously avoids an over-identification by inputting unnecessary or irrelevant feature specificities. The effort required of users is further reduced by the fact that only the most efficient identification criteria are queried.

Figure 3:
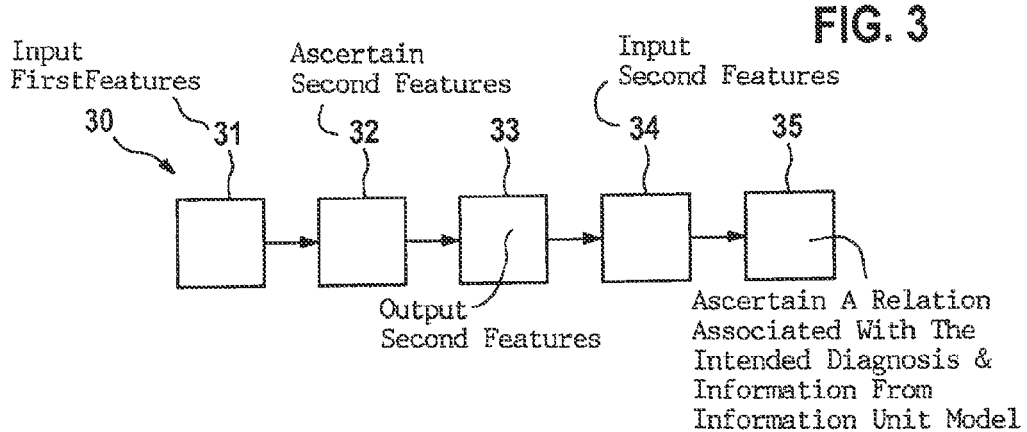
FIG. 3 shows a schematic representation of a method for identifying a vehicle in a vehicle diagnostic unit according to another specific embodiment of the present invention.

FIG. 3 shows a schematic representation of a method 30 for identifying a vehicle 18 in a vehicle diagnostic unit 10. In a first step 31, there is a reception of a first input of feature specificities of first features of a vehicle 18 and of an intended diagnosis of vehicle 18 by a user via an input interface 13.

In a second step 32, there is an ascertainment of second features, which allow for an unequivocal identification of vehicle 18 in relation to the intended diagnosis by a calculation device 15 as a function of the first input, calculation device 15 ascertaining the second features with the aid of a database device 14, in which are stored a component model 21, in which definitions of vehicle components are stored as component instances, an identification model 22, in which assignments of identification features to feature specificities are stored, and an information unit model 23, in which items of diagnostic information and their relations to associated feature specificities stored in identification model 22 as well as component instances stored in a component model are stored.

In a third step 33, the second features ascertained by calculation device 15 are output to the user via an output device 16.

In a fourth step 34, a second input of feature specificities of the second features of vehicle 18 is received via input interface 13 by the user.

In a fifth step 35, calculation device 15 ascertains, as a function of the second input, a relation associated with the intended diagnosis and information from information unit model 23 of database device 14.

The present invention makes it possible to perform a dynamic identification of vehicles without having to use static identification codes. Code systems always depend of the type of the classification of different features. Depending on the perspective or the goal of the identification, different features and components are required for an unequivocal identification of vehicles. For axle alignment, for example, it is decisive which axle geometry and which type of drive a vehicle has.

This information may be irrelevant, for example for categorization in insurance rates or for an exhaust gas test. Dynamic identification methods make it possible to display the components and features relevant for the user independently of existing code or classification systems and to obtain efficiently and quickly an unequivocal identification of a vehicle with respect to an intended diagnosis.

What is claimed is:

1. A device for identifying and diagnosing a vehicle for vehicle repair, comprising:
    an input interface configured to receive a first input of feature specificities of first features of the vehicle and an intended diagnosis of the vehicle by a user;
    a database device storing a component model, an identification model, and an information unit model, wherein definitions of vehicle components are stored as component instances in the component model, associations of features and corresponding feature specificities are stored in the identification model, and the information unit model stores items of diagnostic information and relations of the items of diagnostic information to the associated feature specificities stored in the identification model as well as component instances stored in the component model;
    a calculation device configured to ascertain, on a basis of the first input and with an aid of the component instances, associations and relations stored in the database device, second features of the vehicle which enable an unequivocal identification of the vehicle in relation to the intended diagnosis; and
    an output device configured to output to the user the second features ascertained by the calculation device;
    wherein the input interface is configured to receive a second input of feature specificities of the second features of the vehicle by the user, and wherein the calculation device is configured to ascertain, as a function of the second input, a relation associated with the intended diagnosis from the information unit model of the database device.

2. The device as recited in claim 1, wherein the identification model contains features and code numbers which describe the vehicle.

3. The device as recited in claim 2, wherein at least one of the identification model and the component model implements an ontological model of relations.

4. A vehicle diagnostic unit for vehicle repair, comprising:
    a device for identifying a vehicle, the device having:
        an input interface configured to receive a first input of feature specificities of first features of the vehicle and an intended diagnosis of the vehicle by a user;
        a database device storing a component model, an identification model, and an information unit model, wherein definitions of vehicle components are stored as component instances in the component model, associations of features and corresponding feature specificities are stored in the identification model, and the information unit model stores items of diagnostic information and relations of the items of diagnostic information to the associated feature specificities stored in the identification model as well as component instances stored in the component model;
        a calculation device configured to ascertain, on a basis of the first input and with an aid of the component instances, associations and relations stored in the database device, second features of the vehicle which enable an unequivocal identification of the vehicle in relation to the intended diagnosis; and
        an output device configured to output to the user the second features ascertained by the calculation device;
        wherein the input interface is configured to receive a second input of feature specificities of the second features of the vehicle by the user, and
    wherein the calculation device is configured to ascertain, as a function of the second input, a relation associated with the intended diagnosis from the information unit model of the database device; and
    a diagnostic device configured to execute a test program for the vehicle, the diagnostic device controlling the test program as a function of the relation associated with the intended diagnosis ascertained by the calculation device.

5. The vehicle testing unit as recited in claim 4, wherein the diagnostic device includes one of an axle measurement testing device, an engine tester, an emission testing device, a brake testing device, a shock absorber testing device, a toe testing device, a weighing device, a brake fluid testing device, a sound level meter, a diesel smoke gas tester, a wheel-alignment analyzer, a toe angle testing device, a steering angle tester or an air conditioning testing device.

6. A method for identifying and diagnosing a vehicle for vehicle repair, comprising:
    receiving a first input of feature specificities of first features of the vehicle and an intended diagnosis of the vehicle by a user via an input interface;
    ascertaining, by a calculation device, second features of the vehicle which enable an unequivocal identification of the vehicle in relation to the intended diagnosis, as a function of the first input, the calculation device ascertaining the second features with an aid of a database device which stores (i) a component model in which definitions of vehicle components are stored as component instances, (ii) an identification model in which associations of features and corresponding feature specificities are stored, and (iii) an information unit model which contains items of diagnostic information and relations of the items of diagnostic information to the associated feature specificities stored in the identification model as well as the component instances stored in the component model;
    outputting the second features ascertained by the calculation device to the user via an output device;
    receiving a second input of feature specificities of the second features of the vehicle via the input interface by the user; and
    ascertaining, by the calculation device, a relation associated with the intended diagnosis from the information unit model of the database device, as a function of the second input.

* * * * *